W. JENKINS.
CIRCULAR SAW GUARD.
APPLICATION FILED JUNE 7, 1912. RENEWED JAN. 24, 1914.

1,089,223.

Patented Mar. 3, 1914.

WITNESSES
H. J. S. Young
S. Hallatt

INVENTOR
W. JENKINS

UNITED STATES PATENT OFFICE.

WILLIAM JENKINS, OF MEAFORD, ONTARIO, CANADA.

CIRCULAR-SAW GUARD.

1,089,223. Specification of Letters Patent. Patented Mar. 3, 1914.

Application filed June 7, 1912, Serial No. 702,219. Renewed January 24, 1914. Serial No. 814,238.

*To all whom it may concern:*

Be it known that I, WILLIAM JENKINS, of the town of Meaford, in the county of Grey, in the Province of Ontario, Canada, have invented certain new and useful Improvements in Circular-Saw Guards, of which the following is the specification.

My invention relates to improvements in circular saw guards and the object of the invention is to devise a guard which will completely cover that part of the saw extending above the saw table and which will be resiliently adjustable so as to bear upon the top of the board as it passes between the saw guard and the saw table and it consists essentially of a hood member, a dividing strip extending upwardly through the slot in the saw table in alinement with the saw, a pivotal connection between the dividing strip and the hood and adjustable longitudinally of the strip, resilient pressure means suitably connected to the dividing strip at one end and bearing upon the top of the hood at its opposite end, a supporting bracket for the dividing strip secured beneath the bottom of the saw table, and a resilient connection between the bottom of the dividing strip and the bracket as hereinafter more particularly explained by the following specification.

Figure 1:
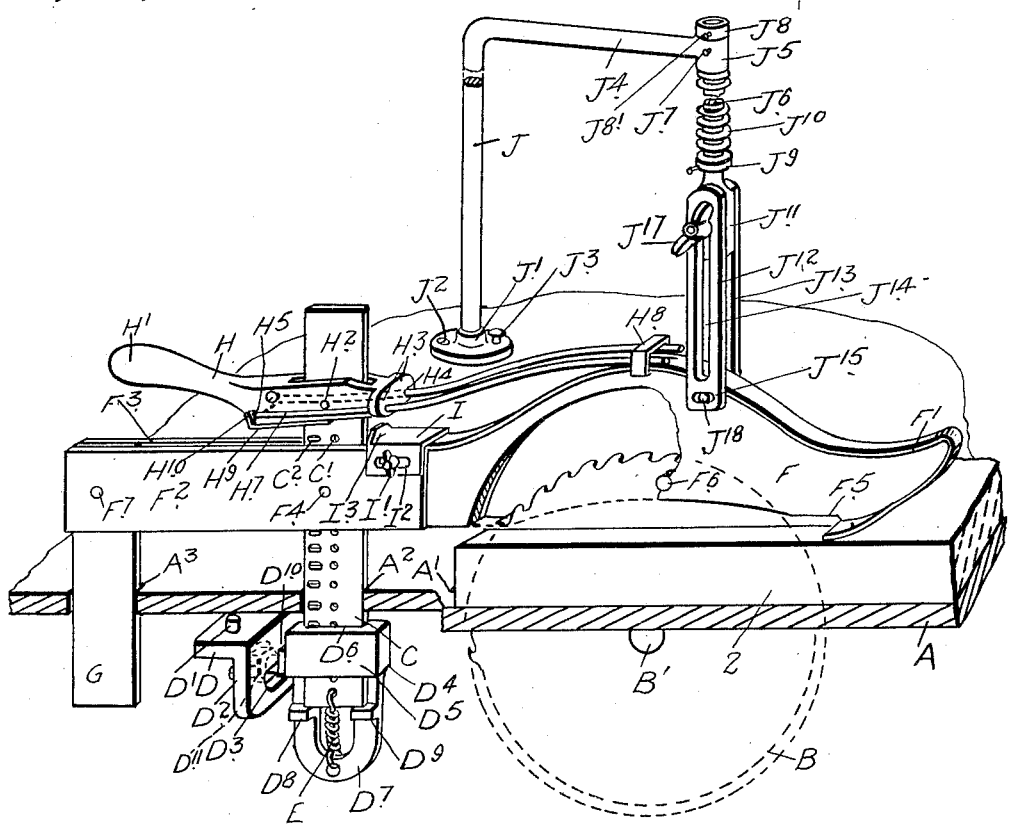
Figures 2, 3:
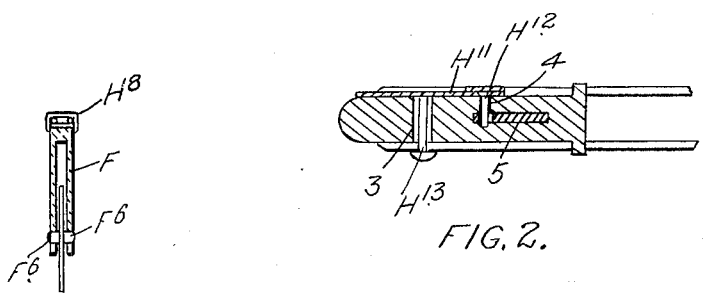

Figure 1, is a general perspective view of my device showing the saw table in section. Fig. 2, is an enlarged plan sectional detail through the dividing strip and the adjustable pressure connection. Fig. 3, is a vertical section through the hood.

In the drawings like letters of reference indicate corresponding parts in each figure.

A is the saw table and B is a circular saw mounted upon the spindle B' in the usual manner and extending upwardly through the slot A' in the saw table.

$A^2$ is a supplemental slot formed in the saw table in alinemnt with the slot A'.

C is a dividing strip extending upwardly through the slot $A^2$ in alinement with the edge of the saw.

D is a bracket secured beneath the saw table by suitable screws D'. The bracket D is provided with a downwardly extending portion $D^2$ having a slot $D^3$ therein.

$D^4$ is a supplemental bracket comprising the body portion $D^5$ having a vertical slot $D^6$ extending therethrough.

$D^7$ is a downwardly extending substantially U-shaped portion forming part of the supplemental bracket $D^4$ and having lateral projections $D^8$ and $D^9$.

The dividing strip C extends through the vertical slot $D^6$ and rests normally upon the projections $D^8$ and $D^9$ at its lower end.

C' are a vertical series of holes formed in the dividing strip C and $C^2$ are a vertical series of slots also formed in the dividing strip C for a purpose which will hereinafter appear.

$D^{10}$ is a shoulder formed on the body portion $D^5$ of the bracket $D^4$ and $D^{11}$ is a set screw extending through the slot $D^3$ into the shoulder $D^{10}$ so as to adjustably clamp the supplemental bracket $D^4$ to the bracket D in any required position.

E is a tension spring connected at its lower end to the lower end of the U-shaped portion $D^7$ of the bracket $D^5$ and at its upper end to the lower end of the dividing strip C.

F is a hood which extends over the upper edge of the saw B as shown in Fig. 1 of the drawings. The hood F is provided with an upwardly extending curved portion F' to allow the board 2, when fed to the saw, to lift the saw guard and to pass beneath the same. The opposite end of the hood F is provided with a horizontal extending portion $F^2$ divided by a vertical slot $F^3$ extending longitudinally thereof. The dividing strip C extends upwardly through the slot $F^3$ and is connected thereto by a pivot pin $F^4$ extending through the portion $F^2$ and through one of the holes of the series $C^2$.

$F^5$ is a notch formed in the lower edge of the hood for a purpose which will hereinafter appear.

$F^6$ are end grain plugs which extend through the sides of the hood and bear against each face of the saw so as to center the saw in the hood opening and hold the hood definitely in position.

G is a supplemental dividing piece extending freely through the slot $A^3$ formed in the saw table A in alinement with the slots $A^2$ and A'. The upper end of the dividing piece G extends into the slot $F^3$ of the portion $F^2$.

$F^7$ is a pin extending through the extension $F^2$ and the dividing piece G so as to pivotally connect the piece G to the extension $F^2$.

H is a pressure lever provided with a handle H'.

$H^2$ is a pin extending through the pressure lever and through one of the series of holes $C^2$.

$H^3$ are lugs extending laterally from the inner end of the pressure lever H.

$H^4$ are holes extending through the lugs $H^3$.

$H^5$ is a notch formed in the pressure lever H beneath the inner end of the handle H' thereof.

$H^7$ is a substantially U-shaped spring finger fitting at one end in the notch $H^5$ and extending forwardly through the holes $H^4$ from whence the side members thereof curve upwardly and bear upon the top of the hood F.

$H^8$ is a retaining loop connected to the top of the hood F and through which the free ends of the spring finger $H^7$ extends so as to retain them in position upon the top of the hood.

$H^9$ is a retaining bracket secured to the bottom of the retaining lever provided with an up-turned lip $H^{10}$ designed to hold the U-shaped end of the spring fingers $H^7$ in the notch $H^5$.

$H^{11}$ is a spring finger secured to one side of the pressure lever H.

3 is a hole extending through the pressure lever and 4 is a hole extending through the pressure lever into the slot 5 through which the dividing strip C extends.

$H^{12}$ is a pin extending from the spring finger $H^{11}$ through the hole 4 and one of the slots $C^3$ in the dividing strip C.

$H^{13}$ is a push plunger extending through the hole 3 and secured to the spring finger $H^{11}$. By pressing upon the push plunger $H^{13}$ it will be found that the operator may force the spring finger $H^{11}$ outwardly and the pin $H^{13}$ out of the slot $C^3$. The pressure lever H may then be swung upon the pin $H^2$ to any desired angle and adjustably secured to such angle by the pin $H^{12}$ passing through another of the slots $C^3$.

I is a bracket secured to the hood extension $F^2$ by means of a thumb screw I' extending through a slot $I^2$ therein. The bracket I is preferably provided with an upwardly turned lip $I^3$. By adjustably securing this bracket at the position desired a limiting stop is provided by which the upward swing of the hood F is limited.

For very heavy work I provide the following supplemental pressure device which I will now describe: J is a standard provided with a suitable circular base J'. $J^2$ is a pivot screw extending through the base J' into the saw table. $J^3$ is a spring plunger of any usual form and designed to extend through the base J' into a suitable orifice in the saw table. The upper end of the standard J is provided with a horizontally extending arm $J^4$ having a T-end $J^5$. $J^6$ is a vertically movable rod held at its upper end in the T $J^5$ by a spring plunger or set screw $J^7$. $J^8$ is a collar secured to the rod $J^6$ above the T $J^5$. The collar $J^8$ is secured to the rod $J^6$ by a spring plunger $J^{8'}$. $J^9$ is a washer secured to the rod $J^6$ by any suitable means such as a set screw. $J^{10}$ is a compression spring extending between the washer $J^9$ and the T $J^5$. $J^{11}$ is a rectangular piece forming the lower end of the rod $J^6$. $J^{12}$ and $J^{13}$ are links provided with vertical slots $J^{14}$ and horizontal slots $J^{15}$ at the lower end thereof. $J^{17}$ is a set nut and bolt extending through the slots $J^{14}$ and the rectangular portion $J^{11}$ so as to adjustably secure the links to the portion $J^{11}$. $J^{18}$ are rollers suitably journaled at each side of the hood F. The rollers $J^{18}$ extend into the slots $J^{15}$ in the links $J^{12}$ and $J^{13}$. By this means any slight upward movement against the compression spring $J^{10}$ is allowed for.

Having described the principal parts involved in my invention I will briefly describe the operation of the same.

The board 2 is forced beneath the upturned end F' of the hood F against the pressure of the spring fingers $H^7$ and the compression spring $J^{10}$ into contact with the saw. As the board is forced forwardly against the saw the opposite end of the hood is raised with the dividing strip C against the tension of the spring E. It will thus be seen that as the saw passes over the saw table the hood F completely covers the exposed portion of the saw and has a resilient pressure upon the board from end to end so that there is absolutely no danger of splinters of wood flying upwardly from the saw as the wood is being cut. When the opposite end of the board is brought beneath the hood the notch $F^5$ springs into position over the end of the board thereby preventing the board flying backwardly over the saw table when freed from the hand of the operator. When it is desired to swing the saw table to an angle all that is necessary to do is to loosen the nut $D^{11}$. The table may then be swung into the desired angle, the body portion $D^5$ of the bracket $D^4$ turning on the set screw $D^{11}$ in the slot $D^3$. When the required position is attained the set screw may be again tightened. If a greater tension is required on the hood F the spring E may be unhooked from one of the holes $C^2$ and inserted in another hole and if still further tension is desired the pin $H^2$ may be withdrawn and reinserted in one of the lower holes $C^2$. If it is desired to temporarily swing the hood above the saw all that it is necessary to do is to press upon the plunger $H^{13}$ so as to withdraw the pin $H^{12}$ from the slot $C^3$. The pressure lever H may then be swung on its pivot formed by the pin $H^2$ and the fingers $H^7$ swung upwardly carrying the hood F upwardly around its pivot $F^4$. The pin $H^{12}$ may then be released so as to retain the hood in such position. The extent to which the hood is swung upwardly is limited as has been before described by the bracket I.

From this description it will be seen that I have devised a very simple device which will absolutely prevent the board either flying upwardly or rearwardly against the operator and thereby prevent any liability of injuring the operator when at work.

It will be also seen that the sawdust which usually flies upwardly from the saw is carried around the hood by the teeth of the saw and deposited at the front of the saw through the slot in the saw table. This not only prevents the sawdust flying in the face of the operator but also keeps the table clean and free of dust.

What I claim as my invention is:

1. In a saw guard, the combination with the dividing strip, of a hood swung at one end on the dividing strip and having an upturned opposite end and an adjustable pressure lever carried by said strip having spring fingers bearing upon said hood, as and for the purpose specified.

2. In a saw guard the combination with the suitably supported dividing strip having a vertical series of holes therein, of a saw covering hood, a pin extending through one end of the hood and through one of the series of holes, a pin extending through the pressure lever and through another of the vertical series of holes located above the hood, a pressure lever carried by said dividing strip, and spring fingers extending forwardly from the pressure lever on to the top of the hood, and means for securing the pressure lever in a definite position, as and for the purpose specified.

3. In a saw guard, the combination with a suitable supported dividing strip having a series of holes therein, of a saw covering hood pivotally carried by said dividing strip, a pressure lever mounted on said dividing strip, a pin extending through the pressure lever, and through one of the series of holes located above the hood, spring fingers extending forwardly from the pressure lever on to the top of the hood, a push plunger secured to the pressure lever, and means operated by the push plunger for engaging the dividing strip to hold the pressure lever definitely in the position to which it is adjustable, as and for the purpose specified.

4. In a saw guard, the combination with the dividing strip having two vertical series of holes, of a saw covering hood, a pin extending through one end of the hood into one of the holes of one of the vertical series, a pressure lever, a pin extending through the pressure lever through one of the vertical series of holes located above the aforesaid hole, a spring finger secured to the pressure lever, a pin extending from the spring finger through the pressure lever into one of the other series of vertical holes, a push plunger carried by the pressure lever and designed to operate the spring finger, and spring pressure fingers extending upwardly from the pressure lever on to the top of the saw covering hood, as and for the purpose specified.

5. In a saw guard, the combination with the saw table having a slot therein, and the dividing strip extending through the hood, of a saw guard pivoted thereto, spring pressure means bearing upon the top of the saw guard, a bracket secured beneath the saw table having a horizontal slot therein, a supplemental bracket having a vertical slot arranged in alinement with the hood of the saw table and into which the lower end of the dividing strip extends, adjustable means for connecting the supplemental bracket in the slot of the main bracket, a depending piece extending from the supplemental bracket and a tension spring connected at one end to the depending piece and at the other end to the dividing strips, as and for the purpose specified.

6. In a saw guard, the combination with the saw table having alined slots, of a dividing strip extending through one slot, means for supporting the dividing strip beneath the saw table, a hood pivoted to the dividing strip, an extension piece extending beyond the pivot point of the hood, a supplemental dividing strip pivotally connected at one end to the extension piece, and depending through another of the alined slots in the saw table, and spring pressure means designed to bear upon the top of the hood, as and for the purpose specified.

7. In a saw guard, the combination with a movable hood, a suitably supported bearing standard having a horizontal arm extending from the upper end and a vertical bearing at the end of the arm, and a spring pressure rod held in the bearing, and adjustable connecting means between the lower end of the rod and the hood, as and for the purpose specified.

8. In a saw guard, the combination with the dividing strip, and a suitable support for the same, of a hood pivoted at one end to the dividing strip, a suitably supported bearing standard having a horizontal arm extending from the upper end, a vertical bearing at the end of the arm, a spring pressure rod held in the bearing, vertical links adjustably secured to the lower end of the spring pressure rod having horizontal slots in proximity to the lower end thereof and rollers extending from the hood into the slots, as and for the purpose specified.

9. In a saw guard, the combination with the dividing strip, and a suitable support for the dividing strip, of a hood pivotally connected at one end to the dividing strip, a suitably supported standard having a horizontal swingable arm, a vertical bearing at the end of the arm, means for locking the arm in position, a spring pressure rod held in the bearing having an enlarged lower end, vertically slotted links, a nut and bolt for adjustably connecting the slotted links to the lower end of the pressure rod, and swingable connecting means between the lower end of the links and the hood, as and for the purpose specified.

10. In a saw guard, the combination with the dividing strip, and a suitable support for the dividing strip, of a hood pivotally connected at one end to the dividing strip, a suitably supported standard having a horizontal arm and a vertical bearing at one end of the arm, a spring pressure rod held within the vertical bearing, means for adjusting the pressure rod within the vertical bearing and vertically slotted links connected at their lower end to the hood and adjustably connecting means extending through the slots in the lower end of the spring rod, as and for the purpose specified.

WILLIAM JENKINS.

Witnesses:
B. BOYD,
M. EGAN.

Copies of this patent may be obtained for five cents each, by addressing the "Commissioner of Patents, Washington, D. C."